United States Patent [19]

Laughner

[11] Patent Number: 4,687,851
[45] Date of Patent: Aug. 18, 1987

[54] POLYURETHANE ELASTOMERS PREPARED FROM HIGH EQUIVALENT WEIGHT POLYAHLS

[75] Inventor: Michael K. Laughner, Lake Jackson, Tex.

[73] Assignee: The Dow Chemical Company, Midland, Mich.

[21] Appl. No.: 766,152

[22] Filed: Aug. 15, 1985

[51] Int. Cl.$^4$ .............................................. C08G 18/48
[52] U.S. Cl. .................................... 544/398; 544/401; 545/248; 545/312; 564/505
[58] Field of Search ................ 544/398, 401; 546/248, 546/312; 564/505

[56] References Cited

U.S. PATENT DOCUMENTS

| | | | |
|---|---|---|---|
| 3,445,525 | 5/1969 | Bormann et al. | 568/609 |
| 4,519,965 | 5/1985 | Taylor et al. | 521/125 |

Primary Examiner—Maurice J. Welsh

[57] ABSTRACT

The disclosed invention is a polyurethane and/or polyurea polymer which is the reaction product of a reaction mixture comprising
(a) a polyisocyanate, and
(b) a polyether polyahl having an equivalent weight of at least about 2000 and a level of unsaturation of less than 0.1% by weight.

The polyurethane and/or polyurea polymer of this invention is an elastomeric material having surprisingly good properties. In particular, the polyurethane and/or polyurea is highly resilient and has excellent tensile properties.

10 Claims, No Drawings

POLYURETHANE ELASTOMERS PREPARED FROM HIGH EQUIVALENT WEIGHT POLYAHLS

BACKGROUND OF THE INVENTION

This invention relates to polyurethane and/or polyurea polymers, particularly polyurethane and/or polyurea polymers prepared from high equivalent weight polyether polyahls having low levels of terminal unsaturation.

Polyurethane and/or polyurea polymers are conventionally prepared by reacting a polyisocyanate with one or more active hydrogen-containing compounds (hereinafter called "polyahls"). In the preparation of elastomeric polyurethanes and flexible polyurethane foams, the polyahl often comprises a high equivalent weight polyether which is prepared by polymerizing an alkylene oxide, an epihalohydrin or tetrahydrofuran in the presence of a polyhydric initiator to form a polyfunctional polymer.

Although the patent literature describes these polyether polyahls as broadly having equivalent weights of up to 6000 or more, in actual practice the equivalent weight of the polyether polyols used has rarely exceeded about 2000. One reason for this limitation is that higher alkylene oxides isomerize during their polymerization, forming terminal allylic unsaturation which both reduces the functionality of the polyether and terminates chain growth. It has therefore been prohibitively expensive to provide very high equivalent weight polyether polyahls of desired functionality. In addition, the lower functionality of the high equivalent weight polyethers causes polyurethane and/or polyurea polymers prepared therefrom to have relatively poor properties.

It would therefore be desirable to provide a polyurethane and/or polyurea polymer having good properties which is prepared from a high equivalent weight polyether polyol.

SUMMARY OF THE INVENTION

This invention is a polyurethane and/or polyurea polymer which is the reaction product of a reaction mixture comprising
  (a) a polyisocyanate, and
  (b) a polyether polyahl having an equivalent weight of at least about 2000 and a level of unsaturation of less than 0.1 milliquivalents of unsaturation per gram of polyahl.

The polyurethane and/or polyurea polymer of this invention is an elastomeric material having surprisingly good properties. In particular, the polyurethane and/or polyurea is surprisingly resilient and has excellent tensile properties. It also has a low glass transition temperature and excellent compression set.

In another aspect, this invention is an amine-initiated polyether having an equivalent weight of at least 2000 and a level of unsaturation of less than 0.1 milliquivalents per gram. Such polyether is useful for preparing polyurethanes having surprisingly good resiliency and excellent low temperature properties.

DETAILED DESCRIPTION OF THE INVENTION

The polyurethane and/or polyurea polymer of this invention is the reaction product of a reaction mixture which comprises a polyisocyanate and a polyether polyol. The polyether polyol has an equivalent weight of at least about 2000, preferably at least about 2500, and a level of unsaturation of less than about 0.1, preferably less than 0.075, more preferably less than 0.06 milliquivalents per gram and most preferably less than about 0.03.

The polyether polyol comprises the reaction product of an alkylene oxide, epihalohydrin, tetrahydrofuran or mixture thereof, in which at least a portion of the alkylene oxide is a C-3 or higher alkylene oxide, i.e. one which is subject to isomerization under the conditions of its polymerization reaction. Thus, propylene oxide, 1,2-butylene oxide, 2,3-butylene oxide, pentylene oxide, hexylene oxide, and higher a, B-alkylene oxides are suitable in preparing the polyether polyol. Mixtures of the higher alkylene oxides and ethylene oxide, styrene oxide or other copolymerizable compounds which are not subject to isomerization can also be employed. However, it is preferred that the alkylene oxide comprise a major proportion of the C-3 or higher alkylene oxide, i.e. at least about 50 weight percent, preferably at least about 70 weight percent of the alkylene oxides employed is a C-3 or higher alkylene oxide.

In preparing the polyether polyol, the alkylene oxide as described is polymerized in the presence of a polyhydric initiator. By "polyhydric" is it meant that the initiator compound contains a plurality of active hydrogen-containing groups which can react with an alkylene oxide to an ether. Suitable polyhydric initiators include low equivalent weight polyols, low equivalent weight amines, and similar compounds. Suitable initiator compounds are disclosed in U.S. Pat. No. 4,495,081, incorporated herein by reference. Preferred hydroxylcontaining initiators include alkylene glycols, glycerine, low molecular weight polyfunctional polyethers, alkylene diamines, sugars such as sucrose and sorbitol, bisphenols and the like.

Preferred amine initiators include, for example, ammonia, monoalkyl amines, mono- di- and trialkanol amines; alkylene diamines such as ethylene diamine, propylene diamine, tetramethylene diamine, hexamethylene diamine and the like; aromatic amines such as pyridine, aniline, piperadine, piperazine and the like; low amine-terminated polyethers such as an amine-terminated poly(oxypropylene)diol aminoalkyl derivatives of the foregoing aromatic amines such as aminoethylpiperazine, and the like.

The polymerization of the alkylene oxide is typically conducted in the presence of a catalyst. Catalysts for the polymerization of alkylene oxides are well-known and include, for example, alkali metal hydroxides, alkali metal alkoxides and similar materials. The catalyst and the polymerization conditions are chosen such that the product polyether contains less than about 0.1, preferably less than 0.075, more preferably less than 0.06 and most preferably less than about 0.03 milliquivalents of terminal unsaturation per gram polymer.

When a hydroxyl-containing initiator is used, the preferred polymerization catalyst and conditions are as described in the co-pending application Ser. No. 758,895 entitled "Process for Preparing Polyethers", filed July 25, 1985. In such process, the polymerization is conducted using a co-catalyst system comprising a metallic compound and a tertiary amine containing compound. The use of such a co-catalyst system provides a polyether having surprisingly low levels of unsaturation at commercially feasible reaction rates.

When an amine initiator is used, basic metallic compounds such as alkali metal hydroxides, particularly sodium hydroxide and potassium hydroxide are suitable catalysts. In such instance, the polyether is prepared with a surprisingly small level of unsaturation, even though no tertiary amine compound (other than the polyether itself) is present. However, the tertiary amine compound may be employed if desired.

In either process, the polymerization is advantageously conducted at elevated temperature and pressure. Suitable temperatures for the polymerization are from about 80° C. to about 180° C., preferably about 90°–120° C. Suitable pressures are from about 20–200 psig. In general, methods and conditions for polymerizing an alkylene oxide in the presence of a polyhydric initiator as are described in U.S. Pat. Nos. 2,902,478, 3,040,076, 3,317,508, 3,341,597 and 3,445,525, all of which are incorporated herein by reference, are suitable to prepare the polyether.

It is often desirable to provide the polyether with more reactive end groups than are ordinarily provided by the polymerization of the alkylene oxide, particularly when the alkylene oxide is the preferred C-3 or higher alkylene oxide. Most commonly introduced end groups are primary hydroxyl and primary and/or secondary amine groups. Primary hydroxyl groups can be introduced to the polyether by reacting it with a small quantity of ethylene oxide. Primary and secondary amine groups can be introduced by a reductive amination process as described in U.S. Pat. No. 3,654,370, incorporated herein by reference.

As discussed hereinbefore, the polyether polyol has an equivalent weight of at least about 2000. Generally preferred are polyethers having an equivalent weight of about 2000–8000, preferably about 2500 to about 6000, and more preferably about 2500 to about 5000. Particularly preferred are difunctional polyethers having a molecular weight of about 4000 to about 12000, especially about 4500 to about 12000. Also particularly preferred are trifunctional polyethers having a molecular weight from about 6000 to about 16000, especially about 7500 to about 15,000 and more especially about 8000 to about 15,000. However, polyethers having a functionality up to about 8, preferably from about 2 to about 4, are useful herein.

The other critical component in the reaction mixture is a polyisocyanate. Suitable polyisocyanates include aliphatic polyisocyanates as well as aromatic polyisocyanates. Such polyisocyanates are described, for example, in U.S. Pat. Nos. 4,065,410, 3,401,180, 3,454,606, 3,152,162, 3,492,330, 3,001,973, 3,594,164, 3,164,605, all incorporated herein by reference.

Aromatic polyisocyanates particularly useful herein include 2,4- and/or 2,6-toluene diisocyanate, diphenylmethanediisocyanate, p-phenylene diisocyanate, polymethylenepolyphenylpolyisocyanates, mixtures thereof and the like. Also useful are polymeric derivatives of diphenylmethanediisocyanate as well as prepolymers or quasi-prepolymers thereof.

Particularly useful aliphatic polyisocyanates include, for example, the hydrogenated derivatives of the foregoing aromatic polyisocyanates, as well as hexamethylene diisocyanate, isophoronediisocyanate, 1,4-cyclohexane diisocyanate and the like.

In addition, prepolymers and quasi-prepolymers of the foregoing polyisocyanates having an -NCO content of about 0.5 to about 30% by weight are useful herein.

The polyisocyanate is generally present in an amount sufficient to provide in the reaction mixture from about 70 to about 500, preferably about 80 to about 150, and more preferably about 95 to about 120 isocyanate groups per 100 active hydrogen atoms.

The polyurethane and/or polyurea polymer is prepared by reacting a reaction mixture containing the polyether as described herein with a polyisocyanate under conditions such that the components react to form the desired polymer. Conditions for the formation of polyurethane and/or polyurea polymers are well known and described, for example, in U.S. Pat. Nos. 3,639,543, 4,495,081, 4,218,513 and 4,451,588 incorporated herein by reference.

In addition to the aforementioned critical components, various optional materials are also advantageously contained in the reaction mixture.

It is often preferred to include one or more low equivalent weight polyahls in the reaction mixture. Such polyahl are commonly referred to in the art as "chain extenders". The use of chain extenders is particularly preferred in the preparation of polyurethane and/or polyurea elastomers or flexible foams. Suitable chain extenders include polyhydroxyl-containing compounds having an equivalent weight from about 31 to about 250, the corresponding mercaptans and polyamines having an similar equivalent weight. Such chain extenders are described in U.S. Pat. Nos. 4,296,945 to Vanderhider and 4,500,442 to Meyer, both incorporated herein by reference. Preferred chain extenders include low equivalent weight glycols such as ethylene glycol, propylene glycol, butanediol, hexanediol, dipropylene glycol, diethylene glycol, tripropylene glycol, triethylene glycol, glycerine, and the like; as well as aromatic diamines such as toluene diamine, diethyltoluenediamine, phenylene diamine; methylene bis(o-chloroaniline), ethylenediamine sodium chloride salts of methylene bis(analine), other blocked or hindered aromatic diamines and the like.

The chain extender, when used, is typically present in an amount ranging from about 2 to about 80, preferably about 5 to about 50, more preferably about 10 to about 35 parts per 100 parts by weight of the polyether (and moderate equivalent weight polyahl as described hereinafter, if any). However, it is recognized that the particular amount of chain extender employed will depend on the desired properties of the polyurethane and/or polyurea. In preparing an elastomer, increasing the amount of chain extender tends to produce a stiffer, more brittle polymer. In a flexible foam, increased levels of chain extender tend to form a tighter foam.

A polyahl of about 250–2000 equivalent weight (sometimes referred to herein as a moderate equivalent weight polyahl) may also be employed in the reaction mixture. Of these, polyether polyols, polyester polyols and aminated or partially aminated polyethers are preferred, although any of the polyahls described in Columns 3–5 of U.S. Pat. No. 4,394,491 to Hoffman may be used for this purpose. The moderate equivalent weight polyahl generally will constitute about 0 to about 70, preferably about 0 to about 50% of the combined weight of the moderate equivalent polyahl and the high equivalent weight polyether.

It is generally useful to employ a catalyst in the reaction mixture. Catalysts for the reaction of isocyanates and active hydrogen containing compounds are well-known and described, for example, in U.S. Pat. No. 4,495,081. Preferred catalysts include tertiary amine compounds and organometallic compounds. Generally, from about 0.10 to about 1 part of catalyst is used per 100 parts of isocyanate-reactive materials in the reaction mixture, although the precise amount thereof is a matter of choice to the skilled artisan. It is noted that when the high equivalent polyether is amine-initiated it will typically be somewhat self-catalytic, and may thus require a reduced level of catalyst or no catalyst at all.

In preparing a polyurethane and/or polyurea foam, it is normal to include a blowing agent in the reaction mixture. Suitable blowing agents include water and low-boiling organic compounds such as halogenated methanes. Particularly useful halogenated methanes include methylene dichloride, trichloromonofluoromethane, dichlorodifluoromethane and the like. Water is commonly employed in an amount from about 0.5–5 parts per 100 parts polyahl. Halogenated methanes are typically used in an amount from about 10–50 parts per 100 parts polyahls. Other blowing agents, such as the so-called azo blowing agents, which generate a gas under the conditions of the polymerization reaction are similarly useful herein.

Other materials which can optionally be employed in the reaction mixture include surfactants, pigments and inert fillers, reinforcing fibers, antioxidants, preservatives, biocides and the like. The beneficial use of such materials is an obvious matter of choice to the skilled artisan.

In preparing the polyurethane and/or polyurea polymer, the polyether, polyisocyanate and other components are reacted, typically under conditions of an elevated temperature. The polymerization reaction may be carried out in a single reaction (one-shot process), or in one or more sequential reaction steps (prepolymer process). In the one-shot process, all the isocyanate-reactive components are reacted simultaneously with the polyisocyanate. In such process, it is normal practice to blend all components except the polyisocyanate into a "B-side" mixture, which is then reacted with the polyisocyanate to form the polyurethane and/or polyurea polymer. However, the order of mixing is not critical as long as the components do not undesirably react before all components are present. The reaction mixture is usually then placed in a mold (except for slabstock foams, which normally are permitted to freely rise) and cured at a suitable temperature. The apparatus used for blending and molding is not especially critical. Hand mixing, conventional machine mixing, and the so-called reaction injection molding (RIM) equipment are all suitable.

In the prepolymer process, all or a portion of one or more of the isocyanate reactive materials is reacted with a stoichiometric excess of the polyisocyanate to form an isocyanate-terminated prepolymer. This prepolymer is then reacted with the remaining isocyanate-reactive materials to prepare the polyurethane and/or polyurea polymer. The prepolymer can be prepared with either the polyether or the chain extender, or a mixture of both. The use of the prepolymer technique to prepare polyurethanes and/or polyureas is described, for example, U.S. Pat. No. 4,297,444, incorporated herein by reference.

The polyurethane and/or polyurea of this invention is useful in preparing elastomeric materials such as rollers, wheels, automobile fascia, steering wheels, gaskets, cushions, insulation, and the like.

The following examples are provided to illustrate the invention and not to limit the scope thereof. All parts and percentages are by weight unless otherwise indicated.

EXAMPLE 1

Preparation of High Equivalent Weight Triols

In a two-gallon reactor equipped with a nitrogen sparge and inlet ports for additions of alkylene oxide are placed 700 grams of a trihydric initiator prepared by reacting glycerine with propylene oxide to 700 molecular weight. The initiator is heated to 80° C. and 15.4 grams of calcium naphthanate are added. After heating further to 105° C. the reactor is evacuated and 25 grams trimethylamine are added. The reactor is padded with 5 psig of nitrogen. About 22.3 pounds of propylene oxide are then added over a 42 hour period, while maintaining the temperature inside the reactor at about 110° C. Samples are occasionally removed from the reactor during the reaction to monitor its progress. After the propylene oxide addition, about 2.2 pounds of ethylene oxide are added over a 6-hour period to provide terminal primary hydroxyl groups. The crude polyether is then purified by the addition of 64 grams magnesium silicate and filtering. About 100 parts per million of an antioxidant are added to the purified polyether. The resulting product is hereinafter designated Polyol A. Polyol A has an equivalent weight of about 2850 and a level of unsaturation of about 0.016 milliquivalents per gram.

Polyol B is prepared in like manner with the following modifications. The initiator is an adduct of aminoethylpiperazine and three moles of propylene oxide. The catalyst is metallic potassium used in an initial amount of 10 grams, with an additional 3 grams being added after the first 30 hours of propylene oxide feed. About 23.4 pounds of propylene oxide are added over about 35.5 hours, followed by the addition of about 2.5 pounds of ethylene oxide over about 7.25 hours. About 300 parts per million of antioxidant are added to the product. Polyol B has an equivalent weight of about 3260 and a level of unsaturation of about 0.07 milliequivalents per gram.

EXAMPLE 2

Preparation of Polyurethane Elastomers

Hydrogenated diphenylmethane diisocyanate is reacted with a portion of Polyol B at ratios such that an isocyanate-terminated prepolymer having an NCO content of 14.0 weight percent is obtained. In a 500-ml flask, 225 grams of this prepolymer are degassed under vacuum. To the prepolymer are added 22.1 grams ethylene glycol. The mixture is further degassed. Then, 0.81 grams of an organotin catalyst are added, again followed by degassing. After thorough blending, the mixture is poured into a preheated mold and pressed under 10,000 pounds pressure at 300° F. for 30 minutes. The properties of the resulting polymer are indicated as sample No. 1 in the following Table.

Sample No. 2 is prepared by reacting 315 grams of warm diphenylmethanediisocyante and 488 grams of Polyol B in the presence of 5 drops of benzoyl chloride to form and isocyanate-terminated perpolymer having an NCO content of 11.8 weight percent. In a suitable flask are degassed 225 grams of this prepolymer and to it are added 27 grams of 1, 4-butane diol and 1.6 ml of an organo mercury catalyst commercially available from Cosden Chemicals as Cocure 44. After degassing and blending, the mixture is molded as described with respect to Sample No. 1. The properties of the resulting polymer are indicated in the following Table.

Sample No. 3 is prepared by reacting 315 grams of diphenylmethanediisocyanate and 487 grams of Polyol A in the manner described for Sample No. 2 to obtain a 12.4% NCO prepolymer. A polymer is prepared and molded as described for Sample No. 2, using 225 grams of this prepolymer, 28.4 grams of 1, 4-butane diol and 1.6 ml of Cocure 44 catalyst. The properties of Sample No. 3 are reported in the following Table.

Sample No. 4 is prepared by reacting 32 grams of the prepolymer used to prepare Sample No. 1, 41 grams of a blend of 47.35% by weight of a sodium chloride salt of diphenylmethanediamine and 52.65% by weight of a 6000 molecular weight aminoethylpiperazine-initiated poly(propylene oxide), and 2 drops of an organotin catalyst. The mixture is degassed and molded as in Samples 1-3. The properties of Sample No. 4 are indicated in the following Table.

A prepolymer is prepared by reacting hydorgenated diphenylmethane diisocyanate with Polyol B in the proportions such that the prepolymer has an NCO content of 14.0 weight percent. Sample No. 5 is prepared by reacting 150 grams of this prepolymer, 149 grams of a 50/50 blend of a sodium chloride salt of diphenylmethanediamine and an 1800 molecular weight ethylene oxide-capped piperazine-initiated poly(propylene oxide) triol, and 0.2 ml of an organotin catalyst. Molding is done under the same conditions as the other Samples, except curing is done for 90 minutes. The properties of this Sample are as indicated in the following Table.

Sample No. 6 is prepared by charging a reactor with 159 grams of the prepolymer used to prepare Sample No. 5 degassing and adding 91.4 grams of a sodium chloride salt of diphenylmethanediamine and 51.6 grams of a 6000 molecular weight ethylene oxide-terminated aminoethylpiperazine-initiated poly(propylene oxide) and 0.2 ml of an organotin catalyst. Molding is done as in the other Samples except for a 60 minute cure time. The properties of this Sample are reported in the following Table.

TABLE

| Sample No. | 1 | 2 | 3 | 4 | 5 | 6 |
|---|---|---|---|---|---|---|
| Tensile Strength, psi[1] | 4315 | 2476 | 3110 | 2348 | 2295 | 2855 |
| Elongation %[1] | 328 | 476 | 331 | 198 | 307 | 290 |
| Shore A hardness[2] | 70 | 95 | 86 | 74 | 71 | 76 |
| Flexural modulus[3] psi | 1387 | 14965 | 10616 | N.D. | N.D. | N.D. |
| Die "C" tear[4] strength, pli | 173 | 404 | 266 | N.D. 235 | 170 | |
| Bashore rebound[5] | 51 | 43 | ·N.D. | 68 | 53 | 63 |
| Tg, °C. | N.D. −59 | −59 | −60 | −64 | −61 | |
| Compression Set,[6] | N.D. | 5.8 | N.D. | N.D. | N.D. | 12.9 |

N.D. = Not Determined
[1]ASTM D-412
[2]ASTM D-2240
[3]ASTM D-790
[4]ASTM D-624
[5]ASTM D-2632-79
[6]ASTM D-395

All of Samples No. 1–6 have excellent resiliency, and very low glass transition temperatures. In addition, although most of these polymers are soft, they nonetheless have good tensile strengths, particularly when compared to similar elastomers of similar hardness.

I claim:

1. An amine-initiated polyether having an equivalent weight of at least about 2000 and a level of unsaturation of less than about 0.06 millequivalent per gram.

2. The amine-initiated polyether of claim 1 wherein the polyether comprises a polymer of a C-3 or higher alkylene oxide.

3. The amine-initiated polyether of claim 2 which is a polymer of propylene oxide or mixtures thereof with ethylene oxide and/or butylene oxide.

4. The amine-initiated polyether of claim 3 which has a level of unsaturation of less than 0.03 milliequivalents per gram.

5. The amine-initiated polyether of claim 4 which has an equivalent weight of about 2000 to about 8000.

6. The amine-initiated polyether of claim 5 which has an equivalent weight of about 2500 to about 6000.

7. The amine-initiated polyether of claim 5 which is initiated with an amine selected from the group consisting of ammonia, monoalkyl amines, monoalkanol amines, dialkanol amines, trialkanol amines, and alkyldialkanol amines.

8. The amine-initiated polyether of claim 7 which is initiated with triethanol amine, triisopropanol amine, or mixtures thereof.

9. The amine-initiated polyether of claim 5 which is initiated with piperazine, aminoethylpiperazine or mixtures thereof.

10. The amine initiated polyether of claim 5 which is initiated with an amine-terminated polyether.

* * * * *